United States Patent
Boggs et al.

(10) Patent No.: US 6,981,129 B1
(45) Date of Patent: *Dec. 27, 2005

(54) BREAKING REPLAY DEPENDENCY LOOPS IN A PROCESSOR USING A RESCHEDULED REPLAY QUEUE

(75) Inventors: Darrell D. Boggs, Aloha, OR (US); Douglas M. Carmean, Beaverton, OR (US); Per H. Hammarlund, Hillsboro, OR (US); Francis X. McKeen, Portland, OR (US); David J. Sager, Portland, OR (US); Ronak Singhal, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 641 days.

This patent is subject to a terminal disclaimer.

(21) Appl. No.: 09/705,668

(22) Filed: Nov. 2, 2000

(51) Int. Cl.$^7$ ............................................. G06F 9/30
(52) U.S. Cl. ...................................................... 712/218
(58) Field of Search ............................... 712/216, 217, 712/218, 245

(56) References Cited

U.S. PATENT DOCUMENTS

| | | | |
|---|---|---|---|
| 3,603,934 A * | 9/1971 | Healh | 714/2 |
| 5,784,587 A | 7/1998 | Lotz et al. | |
| 5,944,818 A * | 8/1999 | Baxter et al. | 712/244 |
| 5,966,544 A | 10/1999 | Sager | |
| 6,212,626 B1 * | 4/2001 | Merchant et al. | 712/218 |
| 6,496,925 B1 * | 12/2002 | Rodgers et al. | 712/244 |
| 6,535,905 B1 * | 3/2003 | Kalafatis et al. | 709/108 |
| 6,542,921 B1 * | 4/2003 | Sager | 709/108 |

FOREIGN PATENT DOCUMENTS

| WO | WO 99/31589 | 6/1999 |
|---|---|---|
| WO | WO 00/41070 | 7/2000 |

OTHER PUBLICATIONS

Johnson, Mike. Superscalar Microprocessor Design. Englewood Cliffs, NJ: Prentice Hall, Inc., ©1991. pp. 133-134.*
PCT International Search Report dated Jun. 21, 2002.
Johnson, M.: "Out-of-Order Issue" Chapter 7, Superscalar Microprocessor Design, Englewoods Cliffs, NJ, U.S., pp. 127-146 XP002111569.
PCT International Search Report dated Sep. 18, 2002.

* cited by examiner

*Primary Examiner*—Eddie Chan
*Assistant Examiner*—Aimee Li
(74) *Attorney, Agent, or Firm*—Thomas R. Lane

(57) ABSTRACT

Breaking replay dependency loops in a processor using a rescheduled replay queue. The processor comprises a replay queue to receive a plurality of instructions, and an execution unit to execute the plurality of instructions. A scheduler is coupled between the replay queue and the execution unit. The scheduler speculatively schedules instructions for execution and increments a counter for each of the plurality of instructions to reflect the number of times each of the plurality of instructions has been executed. The scheduler also dispatches each instruction to the execution unit either when the counter does not exceed a maximum number of replays or, if the counter exceeds the maximum number of replays, when the instruction is safe to execute. A checker is coupled to the execution unit to determine whether each instruction has executed successfully. The checker is also coupled to the replay queue to communicate to the replay queue each instruction that has not executed successfully.

23 Claims, 3 Drawing Sheets

BREAKING REPLAY DEPENDENCY LOOPS IN A PROCESSOR USING A RESCHEDULED REPLAY QUEUE

FIELD OF THE INVENTION

The invention generally relates to processors, and in particular to processors having a replay system for data speculation.

BACKGROUND

The primary function of most computer processors is to execute a stream of computer instructions that are retrieved from a storage device. Many processors are designed to fetch an instruction and execute that instruction before fetching the next instruction. With these processors, there is an assurance that any register or memory value that is modified or retrieved by a given instruction will be available to instructions following it. For example, consider the following set of instructions:

1: Load memory-1 into register-X;
2: Add register-X register-Y into register-Z;
3: Add register-Y register-Z into register-W.

The first instruction loads the content of memory-1 into register-X. The second instruction adds the content of register-X to the content of register-Y and stores the result in register-Z. The third instruction adds the content of register-Y to the content of register-Z and stores the result in register-W. In this set of instructions, instructions 2 and 3 are considered dependent instructions because their execution depends on the result of and prior execution of instruction 1. In other words, if register-X is not loaded with valid data in instruction 1 before instructions 2 and 3 are executed, instructions 2 and 3 will generate improper results.

With traditional fetch and execute processors, the second instruction will not be executed until the first instruction has properly executed. For example, the second instruction may not be dispatched to the processor until a signal is received stating that the first instruction has completed execution. Similarly, because the third instruction is dependent on the second instruction, the third instruction will not be dispatched until an indication that the second instruction has properly executed has been received. Therefore, according to the traditional fetch and execute method, this short sequence of instructions cannot be executed in less time than $T=L_1+L_2+L_3$, where T represents time and $L_1$, $L_2$ and $L_3$ represent the latency of each of the three instructions.

To increase the speed of processing, later, dependent instructions may be selectively chosen and speculatively executed in an effort to anticipate the results needed to increase the throughput of the processor and decrease overall execution time. Data speculation may involve speculating that data retrieved from a cache memory is valid. Processing proceeds on the assumption that data retrieved from the cache is good. However, when the data in the cache is invalid, the results of the execution of the speculatively executed instructions are disregarded, and the processor backs up to re-execute the instruction that was executed. Stated another way, data speculation assumes that data in a cache memory are correct, that is, that the cache memory contains the result from those instructions on which the present instruction is dependent. Data speculation may involve speculating that data from the execution of an instruction on which the present instruction is dependent will be stored in a location in cache memory such that the data in the cache memory will be valid by the time the instruction attempts to access the location in cache memory. The dependent instruction is dependent on the result of a load of the result of the instruction on which it is dependent. When the load misses the cache, the dependent instruction must be re-executed.

For example, while instruction 1 is executing, instruction 2 may be executed in parallel such that instruction 2 speculatively accesses the value stored in a location in cache memory where the result of instruction 1 will be stored. In this way, instruction 2 executes assuming a cache hit. If the value of the contents of the cache memory is valid, then the execution of instruction 1 has completed. If instruction 2 is successfully speculatively executed in advance of the completion of instruction 1, then, rather than execute instruction 2 at the completion of instruction 1, a simple and quick check may be made to confirm that the speculative execution was successful. In this way, processors increase their execution speed and throughput by executing instructions in advance by speculatively executing instruction based on the assumption that needed data will be available in cache memory.

However, in some circumstances instructions are not successfully speculatively executed. In these situations, the speculatively executed instructions must be re-executed.

DETAILED DESCRIPTION

A. Introduction

Figure 1:
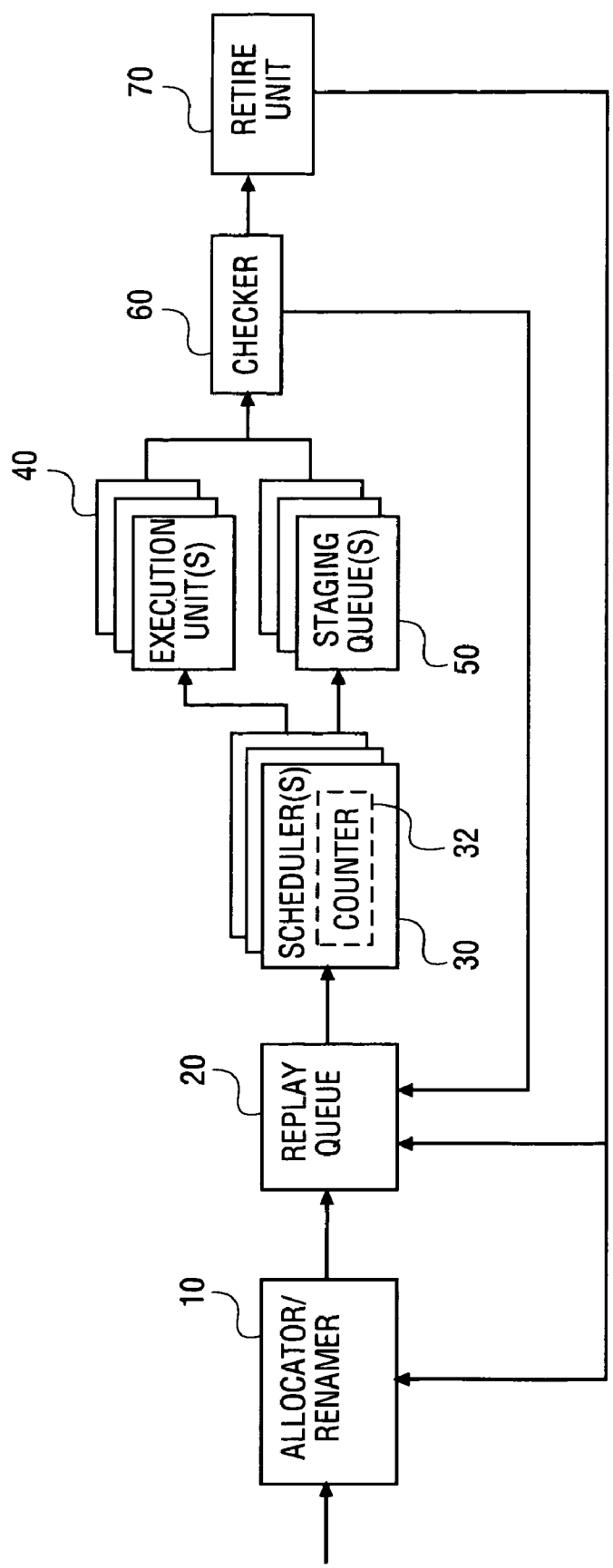
FIG. 1 is a diagram illustrating a portion of a processor according to an embodiment of the present invention.

According to an embodiment of the present invention, a processor is provided that speculatively schedules instructions for execution and allows for replay of unsuccessfully executed instructions. Speculative scheduling allows the scheduling latency for instructions to be reduced. The replay system re-executes instructions that were not successfully executed when they were originally dispatched to an execution unit. An instruction is considered not successfully executed when the instruction is executed with bad input data, or an instruction whose output are bad due to a cache miss, etc. For example, a memory load instruction may not execute properly if there is a cache miss during execution, thereby requiring the instruction to be re-executed. In addition, all instructions dependent thereon must also be replayed.

A challenging aspect of such a replay system is the possibility for long latency instructions to circulate through the replay system and re-execute many times before executing successfully. With long latency instructions, in certain circumstances, several conditions occur which must be resolved serially. When this occurs, each condition results in extra replays for all dependent instructions. This results in several instructions incurring several sequential cache misses. This condition occurs when a chain of dependent instructions are replaying. In the chain, several instructions may each take a cache miss. This results in a cascading set of replays. Each instruction must replay an extra time for each miss in the dependency path. For example, a long latency instruction and instructions dependent on the long latency instruction may be re-executed multiple times until a cache hit occurs.

An example of a long latency instruction is a memory load instruction in which there is an L0 cache miss and an L1 cache miss (i.e., on-chip cache misses) on a first attempt at executing an instruction. As a result, the execution unit may then retrieve the data from an external memory device across an external bus. This retrieval may be very time consuming, requiring several hundred clock cycles. Any unnecessary and repeated re-execution of this long latency load instruction before its source data has become available wastes valuable execution resources, prevents other instructions from executing, and increases overall processor latency.

Therefore, according to an embodiment, a replay queue is provided for storing the instructions. After unsuccessful execution of an instruction, the instruction, and instructions dependent thereon that have also unsuccessfully executed, are stored in the replay queue until the data the instruction requires returns, that is, the cache memory location for the data is valid. At this time, the instruction is considered ready for execution. For example, when the data for a memory load instruction returns from external memory, the memory load instruction may then be scheduled for execution, and any dependent instructions may then be scheduled after execution of the memory load instruction has completed.

B. System Architecture

FIG. 1 is a block diagram illustrating a portion of a processor according to an embodiment of the present invention. Allocator/renamer 10 receives instructions from a front end (not shown). After allocating system resources for the instructions, the instructions are passed to replay queue 20. Replay queue 20 stores instructions in program order. Replay queue 20 may mark instructions as safe or unsafe based on whether the data required by the instruction is available. Instructions are then sent to scheduler 30. Although only one scheduler 30 is depicted so as to simplify the description of the invention, multiple schedulers may be coupled to replay queue 20. Scheduler 30 may re-order the instructions to execute the instructions out of program order to achieve efficiencies inherent with data speculation. To avoid excessive replay looping which decreases processor throughput, increases energy consumption and increases heat emitted, scheduler 30 may include counter 32. Counter 32 may be used to maintain a counter for each instruction representing the number of times the instruction has been executed or replayed. In one embodiment, a counter may be included with replay queue 20. In another embodiment, a counter may be paired with and travel with the instruction. In yet another embodiment, an on-chip memory device may be dedicated to keep track of the replay status of all pending instructions. In this embodiment, the on-chip counter may be accessed by replay queue 20 and/or scheduler 30 and/or checker 60.

In determining the order in which instructions will be sent to be executed, scheduler 30 uses the data dependencies of instructions and the latencies of instructions in determining the order of execution of instructions. That is, based on a combination of the data dependencies of various instructions and the anticipated execution time of instructions, that is, the latency of the instructions, the scheduler determines the order of execution of instructions. Scheduler 30 may refer to counter 32 to determine whether a maximum number of executions or replays has already occurred. In this way, excessive replays of instructions that are unsafe for replaying can be avoided, thus freeing up system resources for the execution of other instructions. Scheduler 30 passes instructions to execution unit 40. Although only one execution unit 40 is depicted so as to simplify the description of the invention, multiple execution units may be coupled to multiple schedulers. In one embodiment, the scheduler may stagger instructions among a plurality of execution units such that execution of the instructions is performed in parallel, and out of order, in an attempt to match the data dependencies of instructions with the expected completion of other parallelly executing instructions on which the instruction is dependent. In one embodiment, a staging queue 50 may also be used to send instruction information in parallel with execution unit 40 in an unexecuted, delayed form. Although a staging queue is depicted, some form of staging is required and any other staging method may be used.

After execution of the instruction, checker 60 determines whether execution was successful. In one embodiment, this may be achieved by analyzing the data dependency of the instruction, and whether a cache hit or cache miss occurred at the cache location of the needed data. More specifically, the checker checks whether replay is necessary by checking the input registers of the instruction to determine whether the data contained therein was valid. To determine whether replay is necessary, the checker may check the condition of the result of the execution to determine whether a cache hit occurred. Other condition may also generate replays. For example, two instructions needing the same hardware resource at the same time may cause one of the instructions to replay, as two instructions may not access the resource simultaneously.

If the instruction executed successfully, the instruction and its result are sent to retire unit 70 to be retired. Retire unit 70 retires the instruction. Retire unit 70 may be coupled to and communicates with allocator/renamer 10 to de-allocate the resources used by the instruction. Retire unit 70 may also be coupled to and communicates with replay queue 20 to signal that the instruction has been successfully executed and should be removed from the replay queue. If the instruction did not execute successfully, checker 60 sends the instruction back to replay queue 20, and the execution cycle, also referred to herein as the replay loop, begins again for the instruction. In one embodiment, replay queue 20 returns instructions to scheduler 30 in program order. In one embodiment, replay queue 20 may be thought of as a rescheduled replay queue, as the instructions are passed back to scheduler 30 for rescheduling and re-execution. In one embodiment, replay queue 20 maintains the instructions in program order.

To determine when instructions should be passed to the scheduler, in one embodiment, replay queue 20 may maintain a set of bits for each instruction that is not retired by checker 60. In this embodiment, replay queue 20 may maintain a replay safe bit, a valid bit, an in-flight bit and a ready bit. The replay queue sets the replay safe bit to one (1) or true when the instruction passes the checker, such that the instruction has completed execution successfully. The replay queue sets the valid bit to one (1) or true when the instruction has been loaded and is in the replay queue. The replay queue sets the in-flight bit to one (1) or true when the instruction is in an execution unit, that is, when the instruction is being executed. The replay queue sets the ready bit to one (1) or true when the inputs or sources needed for the instruction to execute are known to be ready. The ready bit may also be referred to as a source valid bit because it is set to one (1) or true when the sources for the instruction are valid.

Figure 2:
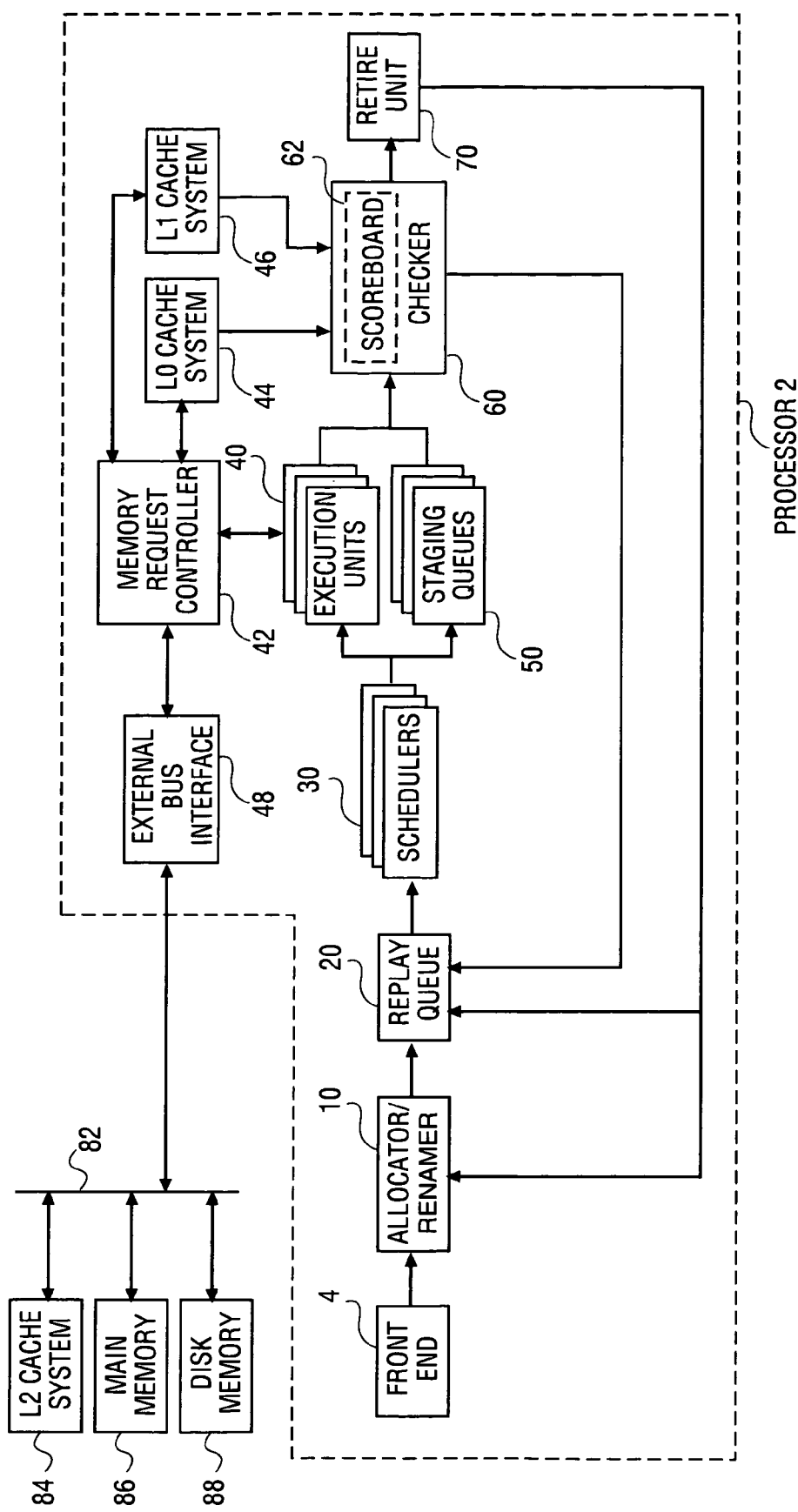
FIG. 2 is a block diagram illustrating a processor including an embodiment of the present invention.

FIG. 2 is a block diagram illustrating a processor including an embodiment of the present invention. Processor 2 includes front end 4 which may include several units, such as an instruction fetch unit, an instruction decoder for decoding instructions, that is, for decoding complex instructions into one or more micro-operations or μops, and an instruction queue (IQ) for temporarily storing instructions. In one embodiment, the instructions stored in the instruction queue may be sops. In other embodiments, other types of instructions may be used. The instructions provided by the front end may originate as assembly language or machine language instructions which may, in some embodiments, be decoded from macro-operations into μops. These μops may be thought of as a machine language of the micro-architecture of a processor. It is these sops that, in one embodiment, are passed by the front end. In another embodiment, particularly in a reduced instruction set computer (RISC) processor chip, no decoding will be required as there is a one-to-one correspondence between the RISC assembly language and the sops of the processor. As set forth herein, the term instructions refers to any macro or micro operations, μops, assembly language instructions, machine language instructions, and the like.

In one embodiment, allocator/renamer 10 may receive instructions in the form of μops from front end 4. In one embodiment, each instruction may include the instruction and up to two logical sources and one logical destination. The sources and destination are logical registers (not shown) within processor 2. In one embodiment, a register alias table (RAT) may be used to map logical registers to physical registers for the sources and the destination. Physical sources are the actual internal memory addresses of memory on the chip dedicated to serve as registers. Logical registers are the registers defined by the processor architecture that may be recognized by persons writing assembly language code. For example, according to the Intel Architecture known as IA-32, logical registers include EAX and EBX. Such logical registers may be mapped to physical registers.

Allocator/renamer 10 is coupled to replay queue 20. Replay queue 20 is coupled to scheduler 30. Although only one scheduler is depicted so as to simplify the description of the invention, multiple schedulers may be coupled to the replay queue. Scheduler 30 dispatches instructions received from the replay queue 20 to be executed. Instructions may be dispatched when the resources, namely physical registers, are marked valid to execute the instructions, and when instructions are determined to be good candidates to execute speculatively. That is, scheduler 30 may dispatch an instruction without first determining whether data needed by the instruction is valid or available. More specifically, the scheduler dispatches speculatively based on the assumption that needed data is available in the cache memory. That is, the scheduler dispatches instructions based on latencies, assuming that the cache location holding needed input to an instruction will result in a cache hit when the instruction requests needed data from the cache memory during execution. Scheduler 30 outputs instructions to execution unit 40. Although only one execution unit is depicted so as to simplify the description of the invention, multiple execution units may be coupled to multiple schedulers. Execution unit 40 executes received instructions. Execution unit 40 may be comprised of an arithmetic logic unit (ALU), a floating point unit (FPU), a memory unit for performing memory loads (memory data reads) and stores (memory data writes), etc.

Execution unit 40 may be coupled to multiple levels of memory devices from which data may be retrieved and to which data may be stored. In one embodiment, execution unit 40 is coupled to L0 cache system 44, and L1 cache system 46, and external memory devices via memory request controller 42. As described herein, the term cache system includes all cache related components, including cache memory and hit/miss logic that determines whether requested data is found in the cache memory. L0 cache system 44 is the fastest memory device and may be located on the same semiconductor die as execution unit 40. As such, data can be retrieved from and written to L0 cache very quickly. In one embodiment, L0 cache system 44 and L1 cache system 46 are located on the die of processor 2, while L2 cache system 84 is located off the die of processor 2. In another embodiment, an L2 cache system may be included on the die adjacent to the L1 cache system and coupled to the execution unit via a memory request controller. In such an embodiment, an L3 cache system may be located off the die of the processor.

If data requested by execution unit 40 is not found in L0 cache system 44, execution unit 40 may attempt to retrieve needed data from additional levels of memory devices. Such requests may be made through memory request controller 42. After L0 cache system 44 is checked, the next level of memory devices is L1 cache system 46. If the data needed is not found in L1 cache system 46, execution unit 40 may be forced to retrieve the needed data from the next level of memory devices, which, in one embodiment, may be external memory devices coupled to processor 2 via external bus 82. An external bus interface 48 may be coupled to memory request controller 42 and external bus 82. In one embodiment, external memory devices may include some, all of, and/or multiple instances of L2 cache system 84, main memory 86, disk memory 88, and other storage devices, all of which may be coupled to external bus 82. In one embodiment, main memory 86 comprises dynamic random access memory (DRAM). Disk memory 88, main memory 86 and L2 cache system 84 are considered external memory devices because they are external to the processor and are coupled to the processor via an external bus. Access to main memory 86 and disk memory 88 are substantially slower than access to L2 cache system 84. Access to all external memory devices is much slower than access to the on-die cache memory systems.

In one embodiment, a computer system may include a first external bus dedicated to an L2 cache system and a second external bus used by all other external memory devices. In various embodiments, processor 2 may include one, two, three or more levels of on-die cache memory systems.

When attempting to load data to a register from memory, execution unit 40 may attempt to load the data from each of the memory devices from fastest to slowest. In one embodiment, the fastest level of memory devices, L0 cache system 44, is checked first, followed by L1 cache system 46, L2 cache system 84, main memory 86, and disk memory 88. The time to load memory increases as each additional memory level is accessed. When the needed data is eventually found, the data retrieved by execution unit 40 is stored in the fasted available memory device to allow for future access. In one embodiment, this may be L0 cache system 44.

Processor 2 further includes a replay mechanism implemented via checker 60 and replay queue 20. Checker 60 is coupled to receive input from execution unit 40 and is coupled to provide output to replay queue 20. This replay mechanism provides that instructions that were not executed successfully may be re-executed or replayed. In one embodiment, staging queue 50 may be coupled between scheduler 30 and checker 60, in parallel with execution unit 40. In this embodiment, staging queue 50 may delay instructions for a fixed number of clock cycles so that the instruction in the execution unit and its corresponding result in the staging queue may enter the checker at the same moment in time. In various embodiments, the number of stages in staging queue 50 may vary based on the amount of staging or delay desired in each execution channel. A copy of each dispatched instruction may be staged through staging queue 50 in parallel to being executed through execution unit 40. In this manner, a copy of the instruction maintained in staging queues 50 is provided to checker 60. This copy of the instruction may then be routed back to replay queue 20 by checker 60 for re-execution if the instruction did not execute successfully.

Checker 60 receives instructions output from staging queue 50 and execution unit 40, and determines which instructions have executed successfully and which have not. If an instruction has executed successfully, checker 60 marks the instruction as completed. Completed instructions are forwarded to retire unit 70 which is coupled to checker 60. Retire unit 70 un-re-orders instructions, placing the instructions in original, program order and retires the instruction. In addition, retire unit 70 is coupled to allocator/renamer 10. When an instruction is retired, retire unit 70 instructs allocator/renamer 10 to de-allocate the resources that were used by the retired instruction. In addition, retire unit 70 may be coupled to and communicate with replay queue 20 so that upon retirement, a signal is sent from retire unit 70 to replay queue 20 such that all data maintained by replay queue 20 for the instruction are de-allocated.

Execution of an instruction may be considered unsuccessful for multiple reasons. The most common reasons are an unfulfilled source dependency and an external replay condition. An unfulfilled source dependency can occur when a source of a current instruction is dependent on the result of another instruction which has not yet completed successfully. This data dependency may cause the current instruction to execute unsuccessfully if the correct data for the source is not available at execution time, that is, the result of a predecessor instruction is not available as source data at execution time resulting in a cache miss.

In one embodiment, checker 60 may maintain a table known as scoreboard 62 to track the readiness of sources such as registers. Scoreboard 62 may be used by checker 60 to keep track of whether the source data was valid or correct prior to execution of an instruction. After an instruction has been executed, checker 60 may use scoreboard 62 to determine whether data sources for the instruction were valid. If the sources were not valid at execution time, this may indicate to checker 60 that the instruction did not execute successfully due to an unfulfilled data dependency, and the instruction should therefore be replayed.

External replay conditions may include a cache miss (e.g., source data was not found in the L0 cache system at time of execution), incorrect forwarding of data (e.g., from a store buffer to a load), hidden memory dependencies, a write back conflict, an unknown data address, serializing instructions, etc. In one embodiment, L0 cache system 44 and L1 cache system 46 may be coupled to checker 60. In this embodiment L0 cache system 44 may generate an L0 cache miss signal to checker 60 when there is a cache miss at the L0 cache system. Such a cache miss indicates that the source data for the instruction was not found in L0 cache system 44. In another embodiment, similar information and/or signals may be similarly generated to checker 60 to indicate the occurrence of a cache miss at L1 cache system 46 and external replay conditions, such as from any external memory devices, including L2 cache, main memory, disk memory, etc. In this way, checker 60 may determine whether each instruction has executed successfully.

If checker 60 determines that the instruction has not executed successfully, checker 60 signals replay queue 20 that the instruction must be replayed, re-executed. More specifically, checker 60 sends a replay needed signal to replay queue 20 that also identifies the instruction by an instruction sequence number, Instructions that do not execute successfully may be signaled to replay queue 20 such that all instructions, regardless of the type of instruction or the specific circumstances under which the instruction failed to execute successfully will be signaled to replay queue 20 and replayed. Such unconditional replaying works well for instructions with short latencies which require only one or a small number of passes or replay iterations between checker 60 and replay queue 20.

As instructions may be speculatively scheduled for execution (i.e., before actually waiting for the correct source data to be available) on the expectation that the source data will be available, if it turns out that the source data was not available at the time of execution but that the sources are now valid, checker 60 determines that the instruction is safe for replay and signals replay queue 20 that the instruction needs to be replayed. That is, because the source data was not available or correct at the time of execution, but that the data sources are now available and ready, checker 60 determines that the instruction is safe for replay and signals replay queue 20 that the instruction is replay safe. In one embodiment, the replay queue may mark a replay safe bit as true and clears an in-flight bit for the instruction. In this situation, in one embodiment, checker 60 may signal replay queue 20 with a replay safe bit paired with an instruction identifier. In other embodiments, the signals may be replaced with the checker sending actual instructions and accompanying information to the replay queue. If at the time execution of the instruction is completed the sources were not and are still not available, the replay safe bit and the in-flight bit may be cleared, that is may be set to false.

Some long latency instructions may require many iterations through the replay loop before finally executing successfully. If the instruction did not execute successfully on the first attempt, checker 60 may determine whether the instruction requires a relatively long period of time to execute (i.e., a long latency instruction), requiring several replays before executing properly. There are many examples of long latency instructions. One example is a divide instruction which may require many clock cycles to execute.

Another example of a long latency instruction is a memory load or store instruction involving multiple levels of cache system misses, such as an L0 cache system miss and an L1 cache system miss. In such cases, an external bus request may be required to retrieve the data for the instruction. If access across an external bus is required to retrieve the desired data, the access delay is substantially increased. To retrieve data from an external memory, a memory request controller may be required to arbitrate for ownership of an external bus, issue a bus transaction (memory read) to the external bus, and then await return of the data from one of the external memory devices. Many more clock cycles may be required to retrieve data from a memory device on an external bus versus when compared to the time needed to retrieve data from on-chip cache systems such as, for example, L0 cache system or L1 cache system. Thus, due to the need to retrieve data from an external memory device across an external bus, load instructions involving cache misses of on-chip cache systems may be considered to be long latency instructions.

During this relatively long period of time while the long latency instruction is being processed, it is possible that an instruction may circulate an inordinate number of times, anywhere from tens to hundreds of iterations, from replay queue 20 to scheduler 30 to execution unit 40 to checker 60 and back again. Through each iteration, a long latency instruction may be replayed before the source data has returned, this instruction unnecessarily occupies a slot in the execution pipeline and uses execution resources which could have been allocated to other instructions which are ready to execute and may execute successfully. Moreover, there may be many additional instructions which are dependent upon the result of this long latency instruction which will similarly repeatedly circulate without properly executing. These dependent instructions will not execute properly until after the data for the long latency instruction returns from the external memory device, occupying and wasting even additional execution resources. The unnecessary and excessive iterations which may occur before the return of needed data may waste execution resources, may waste power, and may increase overall latency. In addition, such iterations may cause a backup of instructions and greatly reduce processor performance in the form of reduced throughput.

For example, where several calculations are being performed for displaying pixels on a display, an instruction for one of the pixels may be a long latency instruction, e.g., requiring a memory access to an external memory device. There may be many non-dependent instructions for other pixels behind this long latency instruction that do not require an external memory access. As a result, by continuously replaying the long latency instruction and its dependent instructions, non-dependent instructions for other pixels may be precluded from execution. Once the long latency instruction has properly executed, execution slots and resources become available, and the instructions for the other pixels may then be executed. To prevent this condition, long latency instructions and instructions dependent thereon are kept in the replay queue until the sources for the long latency instruction are available. The instructions are then released. This is achieved by storing long latency instructions and instructions dependent thereon in replay queue 20. When data for a long latency instruction becomes available, such as when returning from an external memory device, the long latency instruction and its dependent instructions may then be sent by replay queue 20 to scheduler 30 for replay. In one embodiment, this may be accomplished by setting the valid bit to true and clearing, or setting to false or zero, the other bits, such as the in-flight bit, the replay safe bit and the ready bit, for each of the long latency instruction and instructions dependent thereon. In this embodiment, when the replay queue learns that the sources for the long latency instruction are available, the ready bit for the long latency instruction may be set to true, thus causing the replay queue to release the long-latency instruction and instructions dependent thereon to the scheduler. In this manner, long latency instructions will not unnecessarily delay execution of other non-dependent instructions. Performance is improved, throughput is increased, and power consumption is decreased when the non-dependent instructions execute in parallel while the long latency instruction awaits return of its data.

In one embodiment, a long latency instruction may be identified and loaded into replay queue 20, and one or more additional instructions, that is, instructions which may be dependent upon the long latency instruction, may also be loaded into replay queue 20. When the condition causing the long latency instruction to not complete successfully is cleared, such as, for example, when data returns from an external bus after a cache miss or after completion of a division or multiplication operation or completion of another long latency instruction, replay queue 20 then transfers the instructions to scheduler 30 so that the long latency instruction and the additional instructions may then be replayed, re-executed.

However, it may be difficult to identify dependent instructions because there can be hidden memory dependencies, etc. Therefore, in one embodiment, when a long latency instruction is identified and loaded into replay queue 20, all additional instructions which do not execute properly and are programmatically younger may be loaded into the replay queue as well. That is, in one embodiment, younger instructions may have sequence numbers greater than those of older instructions that were provided by the front end earlier in time.

To avoid unnecessary replay of instructions, a counter may also be used. In one embodiment, a counter may be combined with the instruction and related information as it is passed from replay queue to scheduler to execution unit to checker within the processor. In another embodiment, a counter may be included with the replay queue. In yet another embodiment, an on-chip memory device may be dedicated to keep track of the replay status of all pending instructions and may be accessible by the scheduler, the replay queue, and/or the checker. In any of these embodiments, the counter may be used to maintain a the number of times an instruction has been executed or replayed. In one embodiment, when the scheduler receives an instruction, the counter for the instruction may automatically be incremented. The counter is used to break replay dependency loops and to alleviate unnecessary execution of instructions that cannot yet be successfully executed. In one embodiment, the scheduler checks whether the counter for the instruction has exceeded a machine specified maximum number of replays. If the counter exceeds the maximum, the instruction is not scheduled to be executed until the data required by the instruction is available. When the data is available, the instruction is deemed safe for execution. According to this method, any instruction cannot loop through the processor more than the machine specified maximum number of iterations. In this way the replay loop is broken when the machine specified maximum number of iterations has been-exceeded.

C. A Method of Instruction Processing

Figure 3:
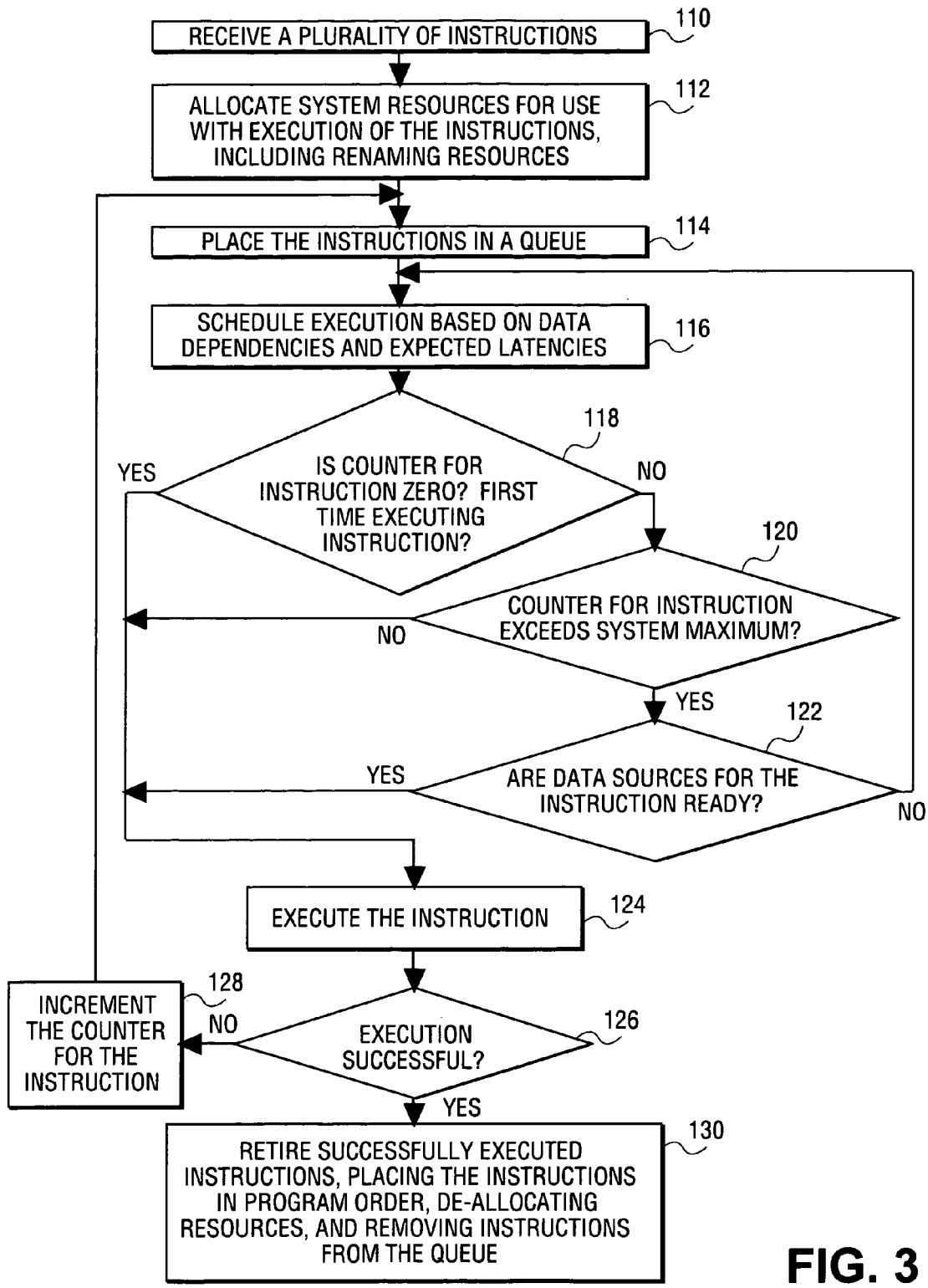
FIG. 3 is a flow chart illustrating a method of instruction processing according to an embodiment of the present invention.

FIG. 3 is a flow chart illustrating a method of instruction processing according to an embodiment of the present invention. A plurality of instructions are received, as shown in block 110. System resources are then allocated for use with the execution of the instructions, including renaming of resources, as shown in block 112. The instructions are then placed in a queue, as shown in block 114. Execution of the instructions is then scheduled based on data dependencies of the instructions and expected latencies of the instructions, as shown in block 116. A check is then made to determine whether a counter for the instruction is set to zero, signifying that it will be the first time that the instruction will be executed, as shown in block 118. If the counter is set to zero, the instruction is then executed as shown in block 124. If the counter is not zero, a check is then made to determine whether the counter for the instruction exceeds a system specified maximum, as shown in block 120. That is, a check is made to determine whether the maximum number of replay iterations has been exceeded. If the counter does not exceed a system specified maximum, the instruction is executed, as shown in block 124. If the counter exceeds the system specified maximum, a check is made to determine whether the data sources for the instruction are ready and available, as shown in block 122. That is, a check is made to determine whether the instruction is safe to be executed. If the instruction is not safe to be executed and if the maximum number of replays has been exceeded, the replay loop is broken, and flow continues at block 116, as shown in blocks 120 and 122. That is, whenever the instruction is not safe for execution and the maximum number of replays or executions is exceeded, further replays are prevented until the data for the instruction is available.

If the instruction is being executed or the first time, if the instruction is safe to be executed, or if the maximum number of replays of the instruction has not been exceeded, an attempt is made at executing the instruction, as shown in block 124. In the situations where the instruction is being executed for the first time and when the counter has not been exceeded, the instruction is executed whether or not the data for it is available. In this way, the execution may be made speculatively. A check is then made to determine if the execution of the instruction was successful, as shown in block 126. If execution of the instruction was not successful, the method continues at block 128 where the counter for the instruction is incremented. The a signal is then sent to the queue signifying that that execution was unsuccessful and the instruction should be rescheduled for re-execution. If execution of the instruction is successful, as shown in block 126, the instruction is retired, including placing the instructions in program order, de-allocating system resources used by the instruction, and removing the instruction and related information from the queue, as shown in block 130.

In another embodiment, the checks for data availability and exceeding the replay counter may be reversed. In this embodiment, blocks 120 and 122 may be executed in reverse order. In this embodiment, a check is made to learn whether the instruction is safe, and, if it is, the instruction is executed. If the instruction is not safe, a check is made to determine whether the maximum number of replays has been exceeded; if it has, the replay loop is broken, and flow proceeds to block 116. If the maximum number of replays has not been exceeded, a speculative execution proceeds.

In the foregoing specification, the invention has been described with reference to specific embodiments thereof. It will, however, be evident that various modifications and changes can be made thereto without departing from the broader spirit and scope of the invention as set forth in the appended claims. The specification and drawings are, accordingly, to be regarded in an illustrative rather than a restrictive sense.

What is claimed is:

1. A processor comprising:
   a replay queue to receive a plurality of instructions;
   an execution unit to execute the plurality of instructions;
   a scheduler coupled between the replay queue and the execution unit to speculatively schedule instructions for execution, to increment a counter for each of the plurality of instructions to reflect the number of times each of the plurality of instructions has been executed, and to dispatch each instruction of the plurality of instructions to the execution unit either when the counter does not exceed a maximum number of replays or, if the counter for the instruction exceeds the maximum number of replays, when the instruction is safe to execute; and
   a checker coupled to the execution unit to determine whether each instruction has executed successfully, and coupled to the replay queue to communicate to the replay queue each instruction that has not executed successfully.

2. The processor of claim 1 further comprising:
   an allocator/renamer coupled to the replay queue to allocate and rename those of a plurality of resources needed by the instruction.

3. The processor of claim 2 further comprising:
   a front end coupled to the allocator/renamer to provide the plurality of instructions to the allocator/renamer.

4. The processor of claim 2 further comprising:
   a retire unit to retire the plurality of instructions, coupled to the checker to receive those of the plurality of instructions that have executed successfully, and coupled to the allocator/renamer to communicate a de-allocate signal to the allocator/renamer.

5. The processor of claim 4 wherein the retire unit is further coupled to the replay queue to communicate a retire signal when one of the plurality of instructions is retired.

6. The processor of claim 1 further comprising:
   at least one cache system on a die of the processor;
   a plurality of external memory devices; and
   a memory request controller coupled to the execution unit to obtain data from the at least one cache system and the plurality of external memory devices.

7. The processor of claim 6 wherein the at least one cache system comprises a first level cache system and a second level cache system.

8. The processor of claim 6 wherein the external memory devices comprise at least one of a third level cache system, a main memory, and a disk memory.

9. The processor of claim 1 further comprising:
   a staging queue coupled between the checker and the scheduler.

10. The processor of claim 1 wherein the counter is one of a plurality of counters such that each counter of the plurality of counters is paired with one of the plurality of instructions.

11. The processor of claim 1 wherein the checker comprises a scoreboard to maintain a status of a plurality of resources.

12. A processor comprising:
    a replay queue to receive a plurality of instructions;
    at least two execution units to execute the plurality of instructions;
    at least two schedulers coupled between the replay queue and the execution units to schedule instructions for execution, to increment a counter for each of the plurality of instructions to reflect the number of times each of the plurality of instructions has been executed, and to communicate each instruction of the plurality of instructions to the execution units when the counter does not exceed a maximum number or, if the counter for the instruction exceeds the maximum number of replays, when a data required by the instruction is available; and
    a checker coupled to the execution units to determine whether each instruction has executed successfully, and coupled to the replay queue to communicate each instruction that has not executed successfully.

13. The processor of claim 12 further comprising:
a plurality of memory devices coupled to the execution units such that the checker determines whether the instruction has executed successfully based on a plurality of information provided by the memory devices.

14. The processor of claim 12 further comprising:
an allocator/renamer coupled to the replay queue to allocate and rename those of a plurality of resources needed by the plurality of instructions.

15. The processor of claim 14 further comprising:
a front end coupled to the allocator/renamer to provide the plurality of instructions to the allocator/renamer.

16. The processor of claim 14 further comprising:
a retire unit to retire the plurality of instructions, coupled to the checker to receive those of the plurality of instructions that have executed successfully, and coupled to the allocator/renamer to communicate a de-allocate signal to the allocator/renamer.

17. The processor of claim 16 wherein the retire unit is further coupled to the replay queue to communicate a retire signal when one of the plurality of instructions is retired.

18. A method comprising:
receiving an instruction of a plurality of instructions;
placing the instruction in a queue with other instructions of the plurality of instructions;
speculatively re-ordering those of the plurality of instructions in a scheduler based on data dependencies and the instruction latencies;
dispatching one of the plurality of instructions to an execution unit to be executed either when a counter reflecting the number of times the instruction has been executed does not exceed a maximum number of replays or, if the counter for the instruction exceeds the maximum number of replays, when a required data for the instruction is available;
executing the instruction;
determining whether the instruction executed successfully;
routing the instruction back to the queue if the instruction did not execute successfully; and
retiring the instruction if the instruction executed successfully.

19. The method of claim 18 further comprising:
allocating those of a plurality of system resources needed by the instruction.

20. The method of claim 19 wherein retiring comprises:
de-allocating those of the plurality of system resources used by the instruction being retired;
removing the instruction and a plurality of related data from the queue.

21. The method of claim 18, wherein the counter is one of a plurality of counters, one for each of the plurality of instructions in the scheduler, further comprising:
maintaining the plurality of counters, such that the counters reflect the number of times the corresponding instruction has been executed.

22. The method of claim 21 wherein each of the plurality of counters for the instruction is paired with each of the plurality of the instructions.

23. The method of claim 21 wherein the plurality of counters is stored in the scheduler.

* * * * *